United States Patent
Gutowski et al.

(10) Patent No.: US 8,647,716 B2
(45) Date of Patent: *Feb. 11, 2014

(54) METHOD OF DISSOCIATING AN ORGANOBORANE-AMINE COMPLEX

(75) Inventors: Keith E. Gutowski, Clawson, MI (US); David Cranfill, Brighton, MI (US)

(73) Assignee: BASF SE (DE)

( * ) Notice: Subject to any disclaimer, the term of this patent is extended or adjusted under 35 U.S.C. 154(b) by 111 days.

This patent is subject to a terminal disclaimer.

(21) Appl. No.: 13/379,377

(22) PCT Filed: Jun. 24, 2010

(86) PCT No.: PCT/EP2010/059005
§ 371 (c)(1),
(2), (4) Date: Dec. 20, 2011

(87) PCT Pub. No.: WO2010/149742
PCT Pub. Date: Dec. 29, 2010

(65) Prior Publication Data
US 2012/0100293 A1      Apr. 26, 2012

Related U.S. Application Data

(60) Provisional application No. 61/220,876, filed on Jun. 26, 2009.

(51) Int. Cl.
*B05D 3/04* (2006.01)

(52) U.S. Cl.
USPC .............................. 427/341; 427/331; 427/337

(58) Field of Classification Search
None
See application file for complete search history.

(56) References Cited

U.S. PATENT DOCUMENTS

| 4,389,433 | A | 6/1983 | Pampalone |
| 7,863,583 | B2 | 1/2011 | Daiss et al. |
| 2007/0196579 | A1 | 8/2007 | Neckers et al. |
| 2008/0085983 | A1* | 4/2008 | Ahn .................................. 528/5 |
| 2009/0111701 | A1* | 4/2009 | Ahn et al. .......................... 506/7 |

(Continued)

FOREIGN PATENT DOCUMENTS

| DE | 102004030674 A1 | 1/2006 |
| EP | 0087969 A1 | 9/1983 |

(Continued)

OTHER PUBLICATIONS

International search report for PCT/EP2010/059005 mailed Sep. 24, 2010.

(Continued)

*Primary Examiner* — Erma Cameron
(74) *Attorney, Agent, or Firm* — Novak Druce Connolly Bove + Quigg LLP (57) ABSTRACT

A method of dissociating an organoborane-amine complex in a coating composition is provided. The method includes the step of introducing the organoborane-amine complex, the radical polymerizable compound, and optionally an amine, onto a substrate to form the coating composition. The method also includes the step of introducing carbon dioxide into the coating composition in a molar ratio of at least 1:1 of the carbon dioxide to free amine groups present in the coating composition. More specifically, a carbamic zwitterion is formed in-situ from reaction of the carbon dioxide and the free amine groups. The formation of the carbamic zwitterion leads to dissociation of the organoborane-amine complex and formation of a radical. The radical is then used to polymerize the radical polymerizable compound.

21 Claims, 4 Drawing Sheets

(56) References Cited

U.S. PATENT DOCUMENTS

| | | |
|---|---|---|
| 2010/0297355 A1 | 11/2010 | Cranfill et al. |
| 2010/0298490 A1 | 11/2010 | Caiozzo et al. |
| 2012/0094027 A1 | 4/2012 | Cranfill et al. |
| 2012/0100378 A1 | 4/2012 | Ohrbom et al. |
| 2012/0116013 A1 | 5/2012 | Gutowski et al. |

FOREIGN PATENT DOCUMENTS

| | | |
|---|---|---|
| WO | WO-2005000980 A2 | 1/2005 |
| WO | WO 2008/085234 | 7/2008 |
| WO | WO-2010149637 A1 | 12/2010 |
| WO | WO-2010149733 A1 | 12/2010 |
| WO | WO-2010149746 A1 | 12/2010 |
| WO | WO-2010149747 A1 | 12/2010 |

OTHER PUBLICATIONS

International Preliminary Report on Patentability from corresponding International Application No. PCT/EP2010/059005 dated Jan. 4, 2012.

Cyril Ollivier et al., "Organoboranes as a Source of Radicals", Chem. Rev. vol. 101, pp. 3415-3434 (2001).

Vincent Darmency et al., "Tin-Free Radical Reactions Mediated by Organoboron Compounds", Top Curr chem vol. 263, pp. 71-106 (2006).

Mark F. Sonnenschein et al., "Mechanism of Trialkylborane Promoted Adhesion to Low Surface Energy Plastics", Macromolecules, vol. 37, pp. 7974-7978 (2004).

Mark F. Sonnenschein et al., "Physical and Chemical Probes of the Bond Strength between Trialkylboranes and Amines, and Their Utility as Stabilized Free Radical Polymerization Catalysts", Macromolecules, vol. 39, pp. 2507-2513 (2006).

Andrei V. Fedorov et al., "Remote Polymerization of Coatings with the Release of Borane from Its Amine Complex", Journal of Applied Polymer Science, vol. 107, pp. 147-152 (2008).

Andrei V. Fedorov, "New Method to Reduce Oxygen Surface Inhibition by Photorelease of Boranes from Borane/Amine Complexes", Macromolecules, vol. 40, pp. 3554-3560 (2007).

V. A. Bhanu et al., "Role of Oxygen in Polymerization Reactions", Chemical Reviews, vol. 91, No. 2, pp. 99-117 (1991).

Michael Caplow, "Kinetics of Carbamate Formation and Breakdown", J. Am. Chem. Soc., vol. 90:24, pp. 6795-6803 (1968).

P. V. Danckwerts, "The Reaction of $CO_2$ with Ethanolamines", Chemical Engineering Science, vol. 34, pp. 443-446 (1979).

John E. Crooks et al., "Kinetics and mechanism of the Reaction between Carbon Dioxide and Amines in Aqueous Solution", J. Chem. Soc. Perkin Trans. II (1989).

Eleanor D. Bates et al., "$CO_2$ Capture by a Task-Specific Ionic Liquid", J. Am. Chem. Soc. vol. 124, No. 6 (2002).

International Search Report of PCT/EP2010/059011 (Sep. 24, 2010).
International Search Report of PCT/EP2010/059009 (Sep. 24, 2010).
International Search Report of PCT/EP2010/058773 (Sep. 13, 2010).

* cited by examiner

Radical Initiation $$R_3B + O_2 \longrightarrow R_2BOO\bullet + R\bullet$$

Radical Propagation $$R\bullet + O_2 \longrightarrow ROO\bullet$$

$$ROO\bullet + R_3B \longrightarrow (ROO)BR_2 + R\bullet$$

Probable Side Reactions $$(ROO)BR_2 + O_2 \longrightarrow (ROO)_2BR$$

$$(ROO)_2BR + R_3B \longrightarrow 2\,(RO)BR_2$$

$$(RO)BR_2 + O_2 \longrightarrow (RO)_3B$$

METHOD OF DISSOCIATING AN ORGANOBORANE-AMINE COMPLEX

CROSS-REFERENCE TO RELATED APPLICATIONS

This application is a national stage application (under 35 U.S.C. §371) of PCT/EP2010/059005, filed Jun. 24, 2010, which claims benefit of U.S. Provisional application 61/220,876, filed Jun. 26, 2009.

FIELD OF THE INVENTION

The present invention generally relates to a method of dissociating an organoborane-amine complex in a coating composition. More specifically, a carbamic zwitterion is formed in-situ from a reaction of carbon dioxide and free amine groups in the coating composition such that the organoborane-amine complex dissociates and forms a radical which is used to polymerize a radical polymerizable compound.

DESCRIPTION OF THE RELATED ART

Automotive finishing and refinishing is a growing industry in the United States and other countries due to an ever increasing number of vehicles being produced. Typically, original equipment manufacturing (OEM) automotive finish coatings and aftermarket refinish automotive coatings are two-part compositions that require physical mixing of two condensed phases. This mixing typically limits control of curing, increases cure times, and makes application of the coatings to complex shapes and sequestered surfaces difficult.

As such, an interest in using quick cure technology, such as UV-cure and electron beam technology, has arisen in automotive finish and refinish coatings. These technologies utilize free electrons, whether as radicals formed by UV light or as electrons formed from electron beams, to polymerize and cure the coatings. These technologies minimize the curing times of the coatings as compared to differently cured solvent-based and water-based coatings but require expensive equipment such as UV lamps, vacuums, filaments, etc. Thus, use of these technologies is expensive, time consuming, and labor intensive and can suffer from film shrinking and oxygen surface inhibition.

Alternatively, refinish coatings can be cured using heat and large ovens to initiate cross-linking. Typically, the coatings are applied to automobile parts which are then passed through the ovens to cure the coatings. However, use of the ovens is very energy intensive, expensive, and has an adverse impact on the environment. In OEM automobile production facilities, the ovens occupy large footprints and are cumbersome to use.

Other technology has also been developed to improve the speed and efficiency of curing coatings. This technology utilizes boron compounds, e.g. organoborane initiators, to form radicals that polymerize organic monomers and cure the coatings. Organoborane initiators initiate free radical polymerization and promote adhesion of the coatings to low surface energy substrates due to their ability to generate radicals and which polymerize the organic monomers. Without intending to be bound by any particular theory, it is believed that diffusion limited oxidation of the organoborane initiators, and production of the radicals therefrom, is driven by the thermodynamic stability of boron-oxygen bonds in the organoborane initiator and causes the organoborane initiators to be pyrophoric in oxygen. Due to this reactivity, the organoborane initiators are commonly stabilized with blocking agents that render the organoborane initiators less susceptible to oxygen insertion and premature radical generation. The blocking agents dissociate under controlled conditions (e.g. with the application of heat or through exposure to a decomplexing agent) to release the organoborane initiators and initiate free radical formation via reaction with oxygen.

Even using the aforementioned technologies, coatings applied to complex shapes and surfaces or on multi-component parts are typically not able to cure effectively due to an inability of UV light to reach all portions of the coatings. Alternatively, some coatings cannot be exposed to UV light without suffering damage and thus also have a tendency to cure ineffectively. Still further, curing through use of UV light can be inhibited by oxygen. Such oxygen surface inhibition typically results in incomplete curing leading to coatings that are tacky or lack scratch resistance.

As a result, technology has also been developed to alleviate oxygen surface inhibition. This technology includes use of gaseous atmospheres with UV light and irradiation of coatings in gaseous atmospheres. The gaseous atmospheres limit amounts of oxygen that are present during curing thereby limiting oxygen surface inhibition. However, UV and radiation sources used in this type technology are typically disposed at great distances from the coatings such that incomplete curing is reduced but not eliminated. Since radiation sources typically emit large amounts of heat, it is difficult to bring the radiation sources within the gaseous atmospheres and shorten the distances between the radiation sources and the coatings. The heat from the radiation sources causes strong vortexing in the gaseous atmospheres and contaminates the atmospheres with oxygen, thus negating the benefits of using this technology.

One derivative of this technology utilizes organoborane-amine complexes and gaseous initiating agents to effect curing, as described in U.S. Pat. App. Pub. No. 2007/0196579. As is well known in the art, organoborane-amine complexes typically react with decomplexing agents and oxygen and dissociate thereby forming radicals. The radicals initiate polymerization and curing of the coatings. The most common decomplexing agents, such as those used in the '579 publication, are acids, aldehydes, ketones, isocyanates, and anhydrides. The '579 publication describes use of these common decomplexing agents in gaseous form to initiate cure of coating compositions. Although effective in coating compositions on small scales, the technology of the '579 publication cannot be effectively scaled up and used in large scale OEM production facilities due to the cost and toxicity of the decomplexing agents. For example, many of the aforementioned decomplexing agents such as acetaldehyde, formaldehyde, isocyanates, maleic anhydride, methyl (ethyl) ketones, phthalic anhydride, and propionaldehyde are classified by the Environmental Protection Agency as hazardous air pollutants (HAPs). Accordingly, their use is severely restricted in large production facilities and is not environmentally friendly.

Accordingly, there remains an opportunity to develop an improved method of curing coating compositions that does not require heat, UV light, peroxides, or azonitrile initiators and that can be used with complex shapes and sequestered surfaces. There also remains an opportunity to develop such a method that is environmentally friendly and useable in large production facilities with minimal emissions and pollution.

SUMMARY OF THE INVENTION AND ADVANTAGES

The instant invention provides a method of dissociating an organoborane-amine complex in a coating composition.

More specifically, a carbamic zwitterion is formed in-situ to form a radical for the purpose of initiating polymerization of a radical polymerizable compound. The method includes the step of introducing the organoborane-amine complex, the radical polymerizable compound, and optionally an amine, onto a substrate to form the coating composition. The method also includes the step of introducing carbon dioxide into the coating composition in a molar ratio of at least 1:1 of the carbon dioxide to free amine groups present in the coating composition. The carbon dioxide reacts with the free amine groups to form the unstable carbamic zwitterion in-situ and to dissociate the organoborane-amine complex thereby forming the radical. The radical is used to polymerize the radical polymerizable compound.

The carbon dioxide used in the instant method is non-toxic and is not classified as a hazardous air pollutant, thus making this method environmentally friendly and allowing this method to be utilized in large production facilities with minimal emissions and pollution. In addition, the carbon dioxide is inexpensive and is readily available from recycling efforts designed to reduce greenhouse gasses and environmental pollution. In addition, use of the carbon dioxide can minimize oxygen surface inhibition of curing thereby increasing the efficiency of this method. Moreover, use of the carbon dioxide improves control of curing rate and allows for use of one-component (1K) systems that reduce cure times. Still further, the carbon dioxide used in this method can be reclaimed from this method through a thermally reversible reaction, thereby further reducing emissions and pollution.

In addition, the organoborane-amine complex is chemically stable both in air and in many solutions of radical polymerizable compounds. The organoborane-amine complex also resists reaction with impurities at room temperature via Michael additions. This stability reduces a chance that premature polymerization of the radical polymerizable compound will occur, thereby increasing shelf life of the coating compositions. This stability also allows for more efficient, predictable, and reproducible polymerization reactions to be used to cure the coating compositions. The organoborane-amine complex also allows for the polymerization of the radical polymerizable compound at room temperature without the need for visible light, UV light, photoinitiators, electron beams catalysts, and/or curing ovens. This greatly reduces production costs, complexities, and times, decreases a number of synthetic steps required, and increases product yields and concentrations. In addition, this reduces a carbon footprint of the instant invention and saves energy. The organoborane-amine complex also allows the coating composition to rapidly cure at reduced temperatures and to bond to various substrates. This increases production efficiency and speed and further reduces production costs and energy expenditure associated with heating and/or using radiation for curing.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention provides a method of dissociating an organoborane-amine complex in a coating composition via in-situ formation of a carbamic zwitterion to form a radical for the purpose of initiating polymerization of a radical polymerizable compound. The organoborane-amine complex, the carbamic zwitterion, and the radical polymerizable compound are described in greater detail below.

The coating composition, hereafter referred to as "composition", may be used in any industry. The composition may be used in a variety of applications including, but not limited to, original equipment manufacturing (OEM) "finish" coatings, aftermarket "refinish" coatings, automotive coatings, protective coatings, films, encapsulants, gels, sealants, release coatings, conformal coatings, and combinations thereof. Most typically, the composition is used as an automotive OEM finish coating or as an automotive refinish coating as a primer, basecoat, clearcoat, and/or sealant.

The composition may be water-borne or solvent-borne and may be used as a one component (1K) or two component (2K) system. Typically, the composition is solvent-borne and is a 1K system. The composition is typically applied to a substrate and cured to form a film. In one embodiment, the composition is a 2K system and includes two components that are reactive with each other, e.g. the radical polymerizable compound introduced above, a deblocking agent described in greater detail below, and the organoborane-amine complex. In an alternative embodiment, the 2K system includes a cross-linking agent in one component and the radical polymerizable compound in the other component. In this embodiment, the organoborane-amine complex may be present with the cross-linking agent (e.g. a multifunctional acrylate), the radical polymerizable compound, or with both. In yet another embodiment, the composition is a 1K system and includes the radical polymerizable compound. In still another embodiment, the composition is a 1K system and includes the radical polymerizable compound and the organoborane-amine complex. In an additional embodiment, the 1K system includes the radical polymerizable compound, the cross-linking agent, and the deblocking agent. In still further embodiments, the 1K or 2K systems consist essentially of, or consist of, the radical polymerizable compound and organoborane-amine complex. The terminology "consisting essentially of" refers to the 1K or 2K system as including only compounds that do not materially affect the basic and novel characteristics of the systems, such as olefins, polyolefins, alkynes, acrylates, unsaturated acrylic ester resins, functional acrylic ester monomers, and the like. In still other embodiments, the 1K and/or 2K systems may include hindered amine light stabilizers (HALS), UVA packages, flow additives, wetting agents, pigments, cross-linkers, catalysts, and the like. Furthermore, the 1K and/or 2K systems may include acrylates and/or methacrylates as the radical polymerizable compound.

As first introduced above, the radical polymerizable compound is present in the coating composition. The radical polymerizable compound typically includes one or more ethylenically unsaturated groups per molecule, i.e., C=C groups. It is contemplated that the radical polymerizable compound may include two ethylenically unsaturated groups or three or more ethylenically unsaturated groups. The radical polymerizable compound may also include one or more alkynyl groups, i.e., C≡C groups The radical polymerizable compound may be selected from the group of monomers, dimers, oligomers, pre-polymers, polymers, co-polymers, block polymers, star polymers, graft polymers, random co-polymers, and combinations thereof, so long as the radical polymerizable compound is still able to be radically polymerized. In one embodiment, the radical polymerizable compound is a monomer. In another embodiment, the radical polymerizable compound is partially polymerized and is an oligomer or polymer, but still retains an ability to be further polymerized. In a further embodiment, the radical polymerizable compound is selected from the group of mono- and poly-unsaturated glycerols or phospholipids, phosphor diesters, peptides, nucleosides, nucleotides, and combinations thereof, having at least one radically polymerizable functional group.

In still a further embodiment, the radical polymerizable compound is selected from the group of acrylates, carbamates, epoxides, and combinations thereof. Suitable non-limiting examples of carbamates and epoxides are those having at least one radically polymerizable functional group and typically one or more functional groups selected from the group of esters, ethers, ketones, aldehydes, carboxylic acids, amides and ureas, acrylics, sulfur groups, phosphorous groups, and combinations thereof. The carbamates may include aliphatic, cycloaliphatic, and aromatic groups and may have linear or branched structures with various functionalities including, but not limited to, branched hydrocarbon functionality, hydroxyl functionality, carboxylate functionality, carbamate functionality, and/or ester functionality. In a further embodiment, the radical polymerizable compound is selected from the group of α,β-unsaturated aliphatic compounds, vinyl esters, substituted styrenes, esters of methacrylic acid, esters of acrylic acid, and combinations thereof. Examples of suitable α,β-unsaturated aliphatic compounds include, but are not limited to, 1-octene, 1-hexene, 1-decene, and combinations thereof. Non-limiting examples of suitable vinyl esters and styrenes include vinyl acetate, styrene, α-methylstyrene, p-methylstyrene, and combinations thereof.

In other embodiments, the radical polymerizable compound is selected from the group of acrylates, halogen substituted acrylates, alkenoates, carbonates, phthalates, acetates, itaconates, and combinations thereof. Suitable examples of acrylates include, but are not limited to, butyl acrylate, t-butyl acrylate, isobornyl acrylate, isodecyl acrylate, 2-ethylhexyl acrylate, lauryl acrylate, cyclohexyl acrylate, octyl acrylate, isocyanate containing acrylates such as isocyanatoacrylate, and combinations thereof. In additional embodiments, the radical polymerizable compound is selected from the group of diacrylates, triacrylates, polyacrylates, urethane acrylates, unsaturated polyesters, and combinations thereof. Suitable examples of di-, tri-, and poly-acrylates include, but are not limited to, hexanediol diacrylate, tripropyleneglycol diacrylate, trimethylolpropane triacrylate, alkoxylated trimethylolpropane triacrylate, pentaerythritol triacrylate, pentaerythritol tetraacrylate, dipentaerythritol hexaacrylate, and combinations thereof. Suitable non-limiting examples of urethane acrylates include Ebercryl 8402 and Ebercryl 8301 commercially available from UCB Chemicals and Actilane 251, commercially available from Akcros Chemicals. Suitable non-limiting examples of unsaturated polyesters include polyesters prepared with maleic anhydride. In an additional embodiment, the radical polymerizable compound is further defined a mixture of an OH-acrylic resin and a dipentaerythritol penta/hexa acrylate. In yet another embodiment, the radical polymerizable compound is selected from the group of unsaturated acrylic and methacrylic ester resins, functional acrylic and methacrylic ester monomers, and combinations thereof.

In still other embodiments, the radical polymerizable compound is selected from the group of butyleneglycol diacrylate, butylene glycol dimethylacrylate, 2-ethylhexylacrylate, 2-ethylhexylmethacrylate, 2-hydroxyethylacrylate, 2-hydroxyethyl methacrylate, methylacrylate, methylmethacrylate, neopentylglycol diacrylate, neopentylglycoldimethacrylate, glycidyl acrylate, glycidyl methacrylate, allyl acrylate, allyl methacrylate, stearyl acrylate, stearyl methacrylate, tetrahydrofurfuryl acrylate, tetrahydrofurfuryl methacrylate, caprolactone acrylate, perfluorobutyl acrylate, perfluorobutyl methacrylate, 1H-, 1H-, 2H-, 2H-heptadecafluorodecyl acrylate, 1H-, 1H-, 2H-, 2H-heptadecafluorodecyl methacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, polypropyleneglycol dimethacrylate, trimethylolpropanetriacrylate, trimethylolpropanetrimethacrylate, ethoxylated trimethylolpropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, and combinations thereof. Other examples of suitable acrylates include acrylamides and methacrylamides such as N-isopropyl acrylamide and N,N-dimethylacrylamide. In one embodiment, the radical polymerizable compound is selected from the group of alkylene glycol dialkylacrylate, alkylene glycol diacrylate, and combinations thereof. Most typically, the radical polymerizable compound is an acrylate or methacrylate.

Suitable examples of alkenoates include, but are not limited to, alkyl-N-alkenoates, methyl-3-butenoate, and combinations thereof. Suitable examples of carbonates include, but are not limited to, alkyl carbonates, allyl alkyl carbonates such as allyl methyl carbonate, diallyl pyrocarbonate, diallyl carbonate, and combinations thereof. Suitable itaconates for use in the present invention include, but are not limited to, alkyl itaconates such as dimethyl itaconate. Non-limiting examples of suitable acetates include alkyl acetates, allyl acetates, allyl acetoacetates, and combinations thereof. Non-limiting of examples of phthalates include, but are not limited to, allyl phthalates, diallyl phthalates, and combinations thereof.

The radical polymerizable compound may also include styrene and substituted styrenes, particularly when used in conjunction with acrylic monomers. The radical polymerizable compound may alternatively include acrylate tipped polyurethane prepolymers prepared by reacting isocyanate reactive acrylate monomers, oligomers or polymers, such as hydroxy acrylates, with isocyanate functional prepolymers. Also useful are a class of conductive monomers, dopants, oligomers, polymers, and macromonomers having an average of at least one free radical polymerizable group per molecule, and the ability to transport electrons, ions, holes, and/or phonons. Non-limiting examples include, but are not limited to, 4,4'4"-tris[N-(3(2-acryloyloxyethyloxy)phenyl)-N-phenylamino]triphenylamine, and 4,4'4"-tris[N-(3 (benzoyloxyphenyl)-N-phenylamino]triphenylamine.

It is also contemplated that the radical polymerizable compound may include compounds including acryloxyalkyl groups such as an acryloxypropyl group, methacryloxyalkyl groups such as a methacryloxypropyl group, and/or unsaturated organic groups including, but not limited to, alkenyl groups having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic groups may include radical polymerizable groups in oligomeric and/or polymeric polyethers including an allyloxypoly (oxyalkylene) group, halogen substituted analogs thereof, and combinations thereof. In another embodiment, the radical polymerizable compound includes a compound formed by copolymerizing organic compounds having polymeric backbones with the radical polymerizable compound such that there is an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. Of course, it is to be understood that the radical polymerizable compound is not limited to the aforementioned compounds and may include any others known in the art.

In addition to the radical polymerizable compound, the composition may also include the second, a third, or more than three radical polymerizable compounds. The second, third, and any additional radical polymerizable compounds may be the same or different from the radical polymerizable compound described above. In various embodiments, the radical polymerizable compound is typically present in the composition in an amount of from 20 to 99, alternatively in an amount of from 50 to 99, alternatively in an amount of from 60 to 99, alternatively in an amount of from 80 to 99, parts by weight per 100 parts by weight of the composition. In another embodiment, the radical polymerizable compound is present in an amount of from 50 to 80 parts by weight per 100 parts by weight of the composition. In this embodiment, 20 parts by weight of the composition typically includes a solvent. In still other embodiments, the composition typically includes the second, third, and/or additional radical polymerizable compounds with a total amount of radical polymerizable compounds present in the amounts described above.

Referring back to organoborane-amine complex, the instant invention is directed towards dissociating the organoborane-amine complex in the composition. The organoborane-amine complex is typically further defined as a complex formed between an organoborane initiator (i.e., an organoborane ($R_3B$)) and a suitable amine. The amine acts as a blocking agent and renders the organoborane-amine complex stable at ambient conditions and in a variety of solutions of radical polymerizable compounds.

The organoborane initiator typically includes tri-functional boranes which have the general structure:

wherein each of $R^1$-$R^3$ may independently have 1 to 20 carbon atoms and wherein each of $R^1$-$R^3$ independently include one of a hydrogen atom, a cycloalkyl group, a linear or branched alkyl group having from 1 to 12 carbon atoms in a backbone, an aliphatic group, and aromatic group, an alkylaryl group, an alkylene group capable of functioning as a covalent bridge to the boron, and halogen substituted homologues thereof, such that at least one of $R^1$, $R^2$, and $R^3$ includes one or more carbon atoms, and is covalently bonded to boron. Up to two of $R^1$-$R^3$ may also independently be an alkoxy group such as a methoxy or ethoxy group such that at least one of $R^1$-$R^3$ provides a boron-carbon covalent bond. The aliphatic and/or aromatic hydrocarbon groups may be linear, branched, and/or cyclic. The organoborane initiator may be further defined as, but is not limited to, tri-methylborane, tri-ethylborane, tri-n-butylborane, tri-n-octylborane, tri-sec-butylborane, tri-dodecylborane, phenyldiethylborane, and combinations thereof. Other suitable examples include 9-BBN in a 0.5M solution as monomer 9-borabicyclo[3.3.1]nonane in hexanes, 9-BBN in a 0.5M solution as monomer 9-borabicyclo[3.3.1]nonane in tetrahydrofuran, 9-BBN in a 0.5M solution as monomer 9-borabicyclo[3.3.1]nonane in toluene, dibutylboron triflate (DBBT) in a 0.5M solution in n-heptane, dibutylboron triflate (DBBT) in a 0.5M solution in methylene chloride, dibutylboron triflate (DBBT) in a 0.5M solution in toluene, dicyclohexylboron triflate (DCBT) in a 0.5M solution in hexanes, dicyclohexylchloroborane (DCBCL) in a 1M solution in hexanes, methoxydiethylborane (MDEB) as a neat liquid, a 50 wt % solution of methoxydiethylborane (MDEB) in tetrahydrofuran, triethylborane (TEB) as a neat liquid, triethylborane (TEB) as a neat liquid in tetrahydrofuran, triethylborane (TEB) in a 1M solution in hexanes, tri-n-butylborane (TNBB) as a neat liquid, tri-sec-butylborane (TSBB) as a neat liquid. Typically, the organoborane is further defined as tri-n-butylborane. For descriptive purposes only, the structure of tri-n-butylborane is set forth below:

tri-n-butylborane

Additionally, any amine known in the art may be used to form the organoborane-amine complex and serve as a "bound" amine The amine used to form the organoborane-amine complex may be a primary, secondary, or tertiary amine. Typically, the amine includes at least one of an alkyl group, an alkoxy group, an amidine group, an ureido group, and combinations thereof. Particularly suitable amines include, but are not limited to, 1,3-propanediamine, 1,6-hexanediamine, methoxypropylamine, pyridine, isophorone diamine, amine functional compounds including at least one amine functional group such as 3-aminopropyl, 6-aminohexyl, 11-aminoundecyl, 3-(N-allylamino)propyl, N-(2-aminoethyl)-3-aminopropyl, aminomethyl, N-(2-aminoethyl)-3-aminoisobutyl, p-aminophenyl, 2-ethylpyridine, and combinations thereof. In various embodiments, the amine is selected from the group of propylamine, hexylamine, benzylamine, heptylamine, methoxypropylamine, 2-methyl amino ethanol, cysteamine, and combinations thereof. In one embodiment, the amine is a diamine. In another embodiment, the amine is a monoamine.

Referring back to the organoborane-amine complex itself, the instant invention can utilize any organoborane-amine complex known in the art and is not limited to those embodiments described above or set forth below. In various embodiments, the organoborane-amine complex is formed from dialkyl boranes, trialkylboranes, and the like. Moreover, the organoborane initiator may be complexed with the amine and simultaneously bonded to another atom and/or blocking group. These other atoms and/or blocking groups may be any known in the art including carbon compounds, halogenated compounds, transition metal compounds, and the like.

Figure 4:
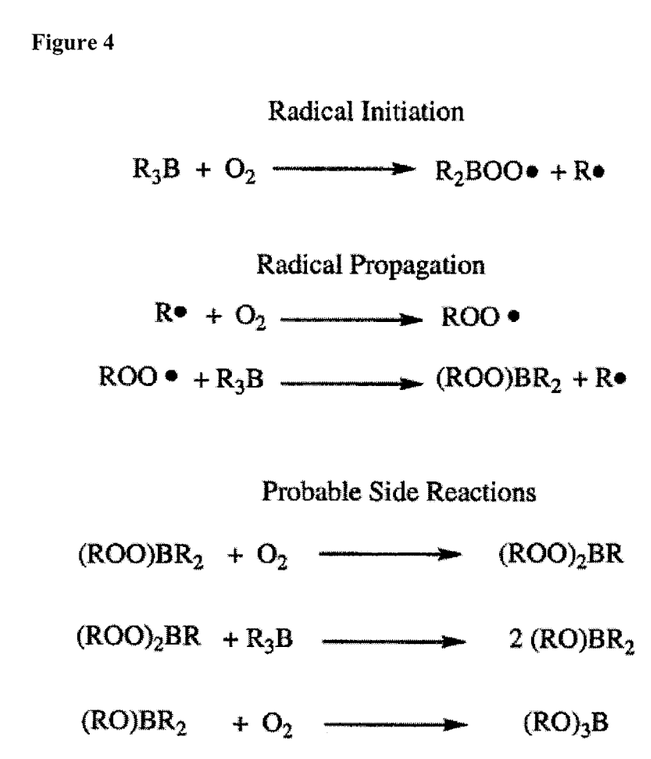
FIG. 4 illustrates theorized reaction schemes of radical formation and propagation utilizing an organoborane initiator and also illustrates probable side reactions that may occur between the organoborane initiator and oxygen.

The organoborane-amine complex is capable of initiating polymerization or cross-linking of the radical polymerizable compound after dissociation of the organoborane initiator from the amine Without intending to be limited by any particular theory, it is believed that tri-substituted boranes, in the presence of triplet oxygen, can undergo bi-molecular homolytic cleavage at a boron-carbon bond to yield corresponding peroxyl, alkoxyl, alkyl, ketone triplet, and/or thiyl (also known as sulfenyl) radicals. These radicals may propagate by reacting with the organoborane initiator that is dissociated from the amine until termination at a trialkyl borate. Theorized reaction schemes of radical formation and propagation, in addition to probable side reactions that occur, are set forth in FIG. 4. Without intending to be bound by any particular theory, it is believed that alkyl radicals (R•) typically initiate polymerization of the radical polymerizable compound.

The organoborane-amine complex typically has the formula:

wherein B represents boron and each of $R^1$-$R^3$ may be the same as described above. Similarly, each of $R^4$-$R^6$ may be any such that the amine is any described above and is a primary, secondary, or tertiary amine. In one alternative embodiment, each of $R^1$, $R^2$, $R^3$, $R^4$, $R^5$, and $R^6$ is independently selected from the group of a hydrogen atom, an alkyl group, an alkoxy group, an arylalkyl group, an alkylene group, halogenated homologs thereof, and combinations thereof. Alternatively, each of $R^4$, $R^5$, and/or $R^6$ may independently be nitrogen and/or sulfur functional. In various embodiments, $R^4$, $R^5$, and/or $R^6$ are diamine functional. In still other embodiments, the organoborane-amine complex has the formula:

wherein each of $R^1$-$R^3$ is as described above and wherein the amine is further defined as a cyclic amine.

Suitable non-limiting examples of the organoborane-amine complex include N,N-diethyl aniline borane (DEANB) as a neat liquid, pyridine borane (PYB) as a neat liquid, a 50 wt % solution pyridine borane (PYB) in pyridine, tert-butylamine borane (TBAB) as a powder, triethylamine borane (TEAB) as a neat liquid, triethylborane-1,3-diaminopropane complex (TEB-DAP) as a neat liquid, trimethylamine borane (TMAB) as a powder, and combinations thereof. An additional suitable example of the organoborane-amine complex is triethylborane complexed with diisopropylamine.

In one embodiment, the organoborane-amine complex is selected from the group of tri-n-butylborane diaminopropane (TnBB-DAP), tri-sec-butylborane methoxypropylamine (TsBB-MOPA), tri-n-butylborane methoxypropylamine (TnBB-MOPA), triethylborane cysteamine (TEB-CA or TEB-cysteamine), tri-n-butylborane cysteamine (TnBB-CA), triethylborane diaminopropane (TEB-DAP), tri-sec-butylborane diaminopropane (TsBB-DAP), and combinations thereof. For descriptive purposes only, chemical structures of these organoborane-amine complexes are set forth below:

Triethylborane Cysteamine (TEB-CA)        Tri-n-butylborane Cysteamine (TnBB-CA)

Tri-n-butylborane Diaminopropane (TnBB-DAP)

Tri-n-butylborane Methoxypropylamine (TnBB-MOPA)

Triethylborane Diaminopropane (TEB-DAP)

Tri-sec-butylborane Methoxypropylamine (TsBB-MOPA)

Tri-sec-butylborane Diaminopropane (TsBB-DAP)

Preferably, the organoborane-amine complex is diamine functional. Particularly suitable examples include, but are not limited to, organoborane-amine complexes that include diaminopropane (DAP) moieties. In one embodiment, the organoborane-amine complex is selected from the group of TEB-DAP, TnBB-DAP, TsBB-DAP, and combinations thereof. Without intending to be bound by any particular theory, it is believed that DAP moieties are particularly preferred because of the presence of a bound and a free amine (group), described in greater detail below. It is to be appreciated that a number of ($-CH_2$) units separating two amines of a diamine functional organoborane-amine complex can vary and is not particularly limited. In one embodiment, the organoborane-amine complex has the following formula: $R_3BH_2NCH_2CH_2CH_2NH_2BR_3$, wherein each R may independently have 1 to 20 carbon atoms, may independently be a hydrogen atom, a cycloalkyl group, a linear or branched alkyl group having from 1 to 12 carbon atoms in a backbone, an aliphatic group, and aromatic group, an alkylaryl group, an alkylene group capable of functioning as a covalent bridge to the boron, and halogen substituted homologues thereof.

The organoborane-amine complex typically has a binding energy of from 5 to 25, more typically of from 10 to 20, and most typically of from 10-15, kcal/mol. As is well known in the art, the binding energy of the organoborane-amine complex refers to a net amount of energy required to decompose the organoborane-amine complex into its components, i.e., the organoborane initiator and the amine. Of course, the instant invention is not limited to the aforementioned binding energies.

The organoborane-amine complex may be physically and/or chemically attached (bound) to a solid particle such as a phase support to control working times, as well as to stabilize liquid phase organoborane-amine complexes against separating during storage. Attachment can be accomplished by a number of known substrate treatments either in-situ or a priori. If the solid particles include functional groups, additives such as substrate treating agents or impurities that are inherently amine-reactive, may require appropriate pre-cautions to avoid premature decomplexation of the organoborane-amine complex being attached. Solid particles including amine-reactive substances can be purified or neutralized before attachment of the organoborane-amine complex. Alternatively, the attachment of the organoborane-amine complex may be performed in an oxygen free environment.

The organoborane-amine complex may be used in any amount to form the composition. Typically, the organoborane-amine complex is used in an amount equivalent to of from 0.01 to 95, more typically of from 0.1 to 80, even more typically of from 0.1 to 30, still more typically of from 1 to 20, even more typically of from 1 to 15, and most typically of from 2 to 5 parts by weight per 100 parts by weight of the composition. The amounts of the organoborane-amine complex depend upon a molecular weight and functionality of the organoborane-amine complex and the presence of other components in the composition such as fillers.

The organoborane initiator of this invention can be synthesized by well known hydroboration techniques. One route of synthesis includes reaction of diethylborane in THF with terminally alkenic compounds. It is known that such reactions generally can produce a mixture of products derived from the addition of boron to either the α-penultimate position or the β-terminal position of the carbon of the double bond. It is to be understood that a β-product, or a mixture of α- and β-products, may also be included in the organoborane initiator.

In various embodiments, the organoborane-amine complex is used for radical polymerization and chain transfers. In various embodiments, the organoborane-amine complex is used to polymerize the radical polymerizable compound to form dimers, oligomers, pre-polymers, polymers, co-polymers, block polymers, star polymers, graft polymers, random co-polymers, and/or combinations thereof that may or may not remain able to be further radically polymerized.

In one embodiment, the organoborane-amine complex is used to polymerize a substituted melamine and an acrylate. An example of such a polymerization is set forth below:

In an alternative embodiment, the organoborane-amine complex is used to polymerize an addition product from the reaction between hydroxy acrylate monomers such as hydroxy ethyl acrylate (HEA) and/or hydroxypropyl acrylate (HPA) and a multi-functional isocyanurate, such as an IPDI trimer, HDI trimer, etc. In a further embodiment, the organoborane-amine complex is used to polymerize an isocyanurate acrylate monomer and a multi-hydroxy or amino functional monomer such as tri-methylolpropane, pentaerythritol, di-ethylene-tri-amine, and the like. In still a further embodiment, the organoborane-amine complex is used to polymerize glycidyl methacrylate. It is also contemplated that acrylate monomers may first be reacted with a substituted melamine, an isocyanurate, or a similar multi-functional moiety to produce a multi-acrylate intermediate which then may be cured into a cross-linked coating composition without UV or other radiation or added heat.

As first described above, the terminology "free amine groups" refers to any amine group that is both (1) available for further reaction and (2) not coordinately bonded (e.g., through a dative or coordinate covalent bond) to the organoborane initiator. It is to be understood that the terminology "free amine" and "free amine group" can be used interchangeably herein. The free amine group may be a primary or secondary amine or may be ammonia, as described above. Typically, the free amine group is a primary amine. In one embodiment, the free amine groups are found in the organoborane-amine complex when the amine of the complex is di-, tri- tetra-, or poly-functional. For example, the organoborane-amine complex may include a first amine group that is coordinately bonded to the organoborane initiator and also include one or more additional amine groups that are not coordinately bonded. These additional amine groups can serve as the free amine groups described above.

In one embodiment, the composition includes an optional amine to provide a source of the free amine. It is to be understood that the source of the free amine is not necessarily the optional amine, as the source of the free amine may be an "un-bound" amine of the organoborane-amine complex, as described above. The optional amine is different from any amine of the organoborane-amine complex in that the optional amine is not part of the organoborane-amine complex, whether bound or un-bound. However, the optional amine may be chemically identical to the amine that is part of the organoborane-amine complex. Alternatively, the optional amine may be different from the amine that is part of the organoborane-amine complex.

Figure 2:
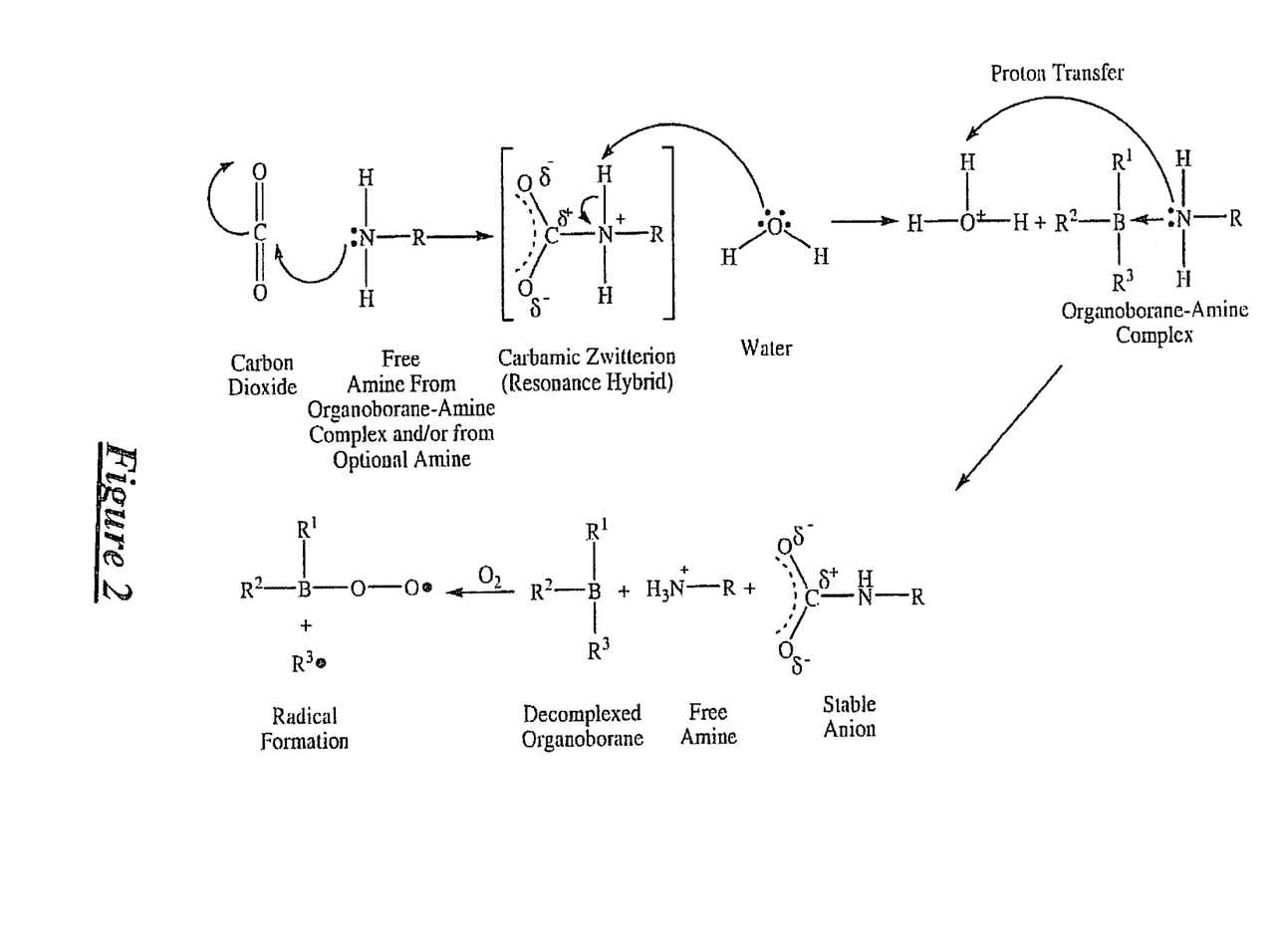
FIG. 2 illustrates a second theoretical reaction mechanism including reaction of carbon dioxide with a free (primary) amine to form a carbamic zwitterion, proton extraction from the carbamic zwitterion through reaction with water, and dissociation of the organoborane from the amine thereby leading to radical formation.
Figure 3:
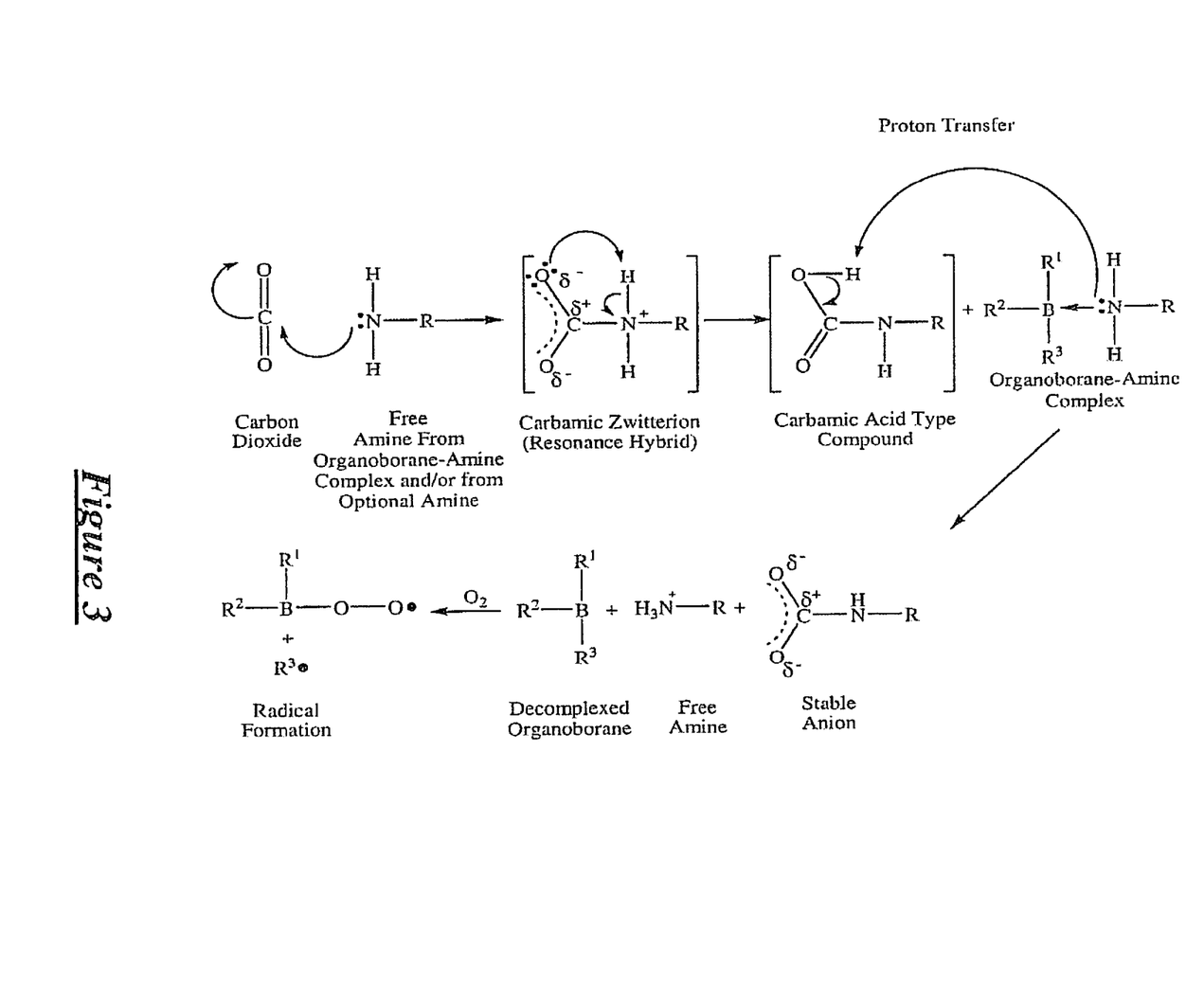
FIG. 3 illustrates a third theoretical reaction mechanism including reaction of carbon dioxide with a free (primary) amine to form a carbamic zwitterion, proton transfer from a nitrogen atom of the carbamic zwitterion to an oxygen atom of the carbamic zwitterion thereby forming a carbamic acid type compound, and dissociation of the organoborane from the amine thereby leading to radical formation.

Typically, the optional and/or free amine promotes the reaction that forms the carbamic zwitterion. In other words, the optional and/or free amine may react with carbon dioxide to form the zwitterion, as described in greater detail below. Typically, the optional amine is not included in the composition if the amine of the organoborane-amine complex is di-, tri-, or poly-amine functional. In this case, the additional amine groups (di, tri, etc) of the organoborane-amine complex act as the free amine groups such that the optional amine is not required. However, even if the amine of the organoborane-amine complex is di-, tri-, or poly-amine functional, the optional amine may still be included. The optional and/or free amine is typically a primary amine but may be a secondary amine, or a combination of primary and secondary amines. In one embodiment, the optional amine is ammonia. In another embodiment, the optional amine is selected from the group of ammonia, methylamine, ethanolamine or 2-aminoethanol, propylamine, 2-propylamine, trisamine, dimethylamine, methylethanolamine or 2-(methylamino)ethanol, hexylamine, heptylamine, benzylamine, methoxypropylamine, cysteamine, aziridine, azetidine, pyrrolidone, piperidine, dimethylethanolamine (DMEA) or 2-(dimethylamino)ethanol, and combinations thereof. The optional and/or free amine is typically included in the composition in a stoichiometric ratio of about 1:1 with the organoborane-amine complex (i.e., with the bound amine of the organoborane-amine complex). Without intending to be bound by any particular theory, it is believed that a stoichiometric excess of the optional and/or free amine promotes a mechanism that competes with the mechanisms of FIGS. 1-3 and thereby competes with the dissociation of the organoborane-amine complex. In other words, if there is a stoichiometric excess of the optional and/or free amine, then proton transfer may occur between free amines and not with the organoborane-amine complex and the carbamic acid type compound. However, a stoichiometric excess of the optional and/or free amine may be utilized by one of skill in the art in this invention. In additional embodiments, the optional and/or free amine is include in various stoichiometric ratios to the carbon dioxide, e.g. 1:2, 1:3, 1:4, 1:5, etc. Typically, a stoichiometric excess of carbon dioxide is preferred.

In one embodiment, the organoborane initiator is blocked with a diamino blocking agent wherein one end of the blocking agent is bound to the organoborane and the other end functions as a free amine, as illustrated below:

In another embodiment, the organoborane initiator is blocked with a mono-functional amino blocking agent wherein an amino end of the blocking agent is bound to the organoborane. In this embodiment, a free amine is also independently present. This free amine is a primary or secondary amine and is preferably "carbon dioxide—philic." A non-limiting example is illustrated below:

In yet another embodiment, the organoborane initiator is blocked with a diamine functional amino blocking agent wherein one end of the blocking agent is bound to the organoborane and the other end functions as a free amine. In this embodiment, the optional amine is also independently present separately from the free amine group that is part of the organoborane-amine complex but unbound to the organoborane initiator. This second free amine is a primary or secondary amine and is preferably "carbon dioxide—philic." This embodiment is also illustrated below:

It is also contemplated that the organoborane initiator may be as described in the provisional patent application entitled Method Of Forming A Cured Coating Composition On An Automobile Component, filed on the same day herewith, having the Ser. No. 61/220,912.

In an alternative embodiment, the method is free of the simultaneous use of (1) the organoborane initiator that is blocked with the diamine functional amino blocking agent and (2) the optional amine As first described above, in this embodiment, the stoichiometric ratio of the free amine to bound amine of the organoborane-amine complex is about 1:1.

In various other embodiments, a sub-stoichiometric (molar) ratio of optional and/or free amine to the organoborane-amine complex (i.e., to the (bound) amine of the organoborane-amine complex) can be utilized. In these embodiments, it is surprising and not apparent to the inventors that the composition including sub-stoichiometric ratios of optional and/or free amine to the organoborane-amine complex (e.g. using $RNH_2:BR_3$) exhibits enhanced curing properties while showing reduced pyrophoricity. In one embodiment, the sub-stoichiometric ratio of optional and/or free amine to the organoborane-amine complex is from 0.5:1 to 1:1. In another embodiment, the sub-stoichiometric ratio of optional and/or free amine to the organoborane-amine complex is from 0.6-0.85:1. In still another embodiment, the sub-stoichiometric ratio of optional and/or free amine to the organoborane-amine complex is from 0.7 to 0.8:1. In a further embodiment, the sub-stoichiometric ratio of optional and/or free amine to the organoborane-amine complex is less than about 1:1. Also, it is to be understood that the organoborane-amine complex and optional and/or free amines of these embodiments are not particularly limited and may be any suitable in the art.

In each of the aforementioned three embodiments, at least a 1:1 molar ratio of the carbon dioxide to the free amine groups is required. Similarly, at least a 1:2 molar ratio of the carbon dioxide to a sum total of both free and bound amines (i.e., amines bound to the organoborane initiator) is also required. As described above, a stoichiometric ratio of about 1:1 of the free amine to the bound amine of the organoborane-amine complex is preferred.

In addition to the aforementioned compounds, the composition may also include one or more additives. The one or more additives may be selected from the group consisting of leveling agents, solvents, surfactants, fillers, stabilizers, solvents, plasticizers, defoaming agents, wetting additives, catalysts, rheology controlling agents, pigments, photosynergists, adhesion promoters, pigment dispersants, flow aids, acid functional polymers, additive polymers, catalysts, and combinations thereof. Examples of suitable but non-limiting solvents include those with high carbon dioxide solubilities such as butyl-, amyl-, and ethyl-acetates and combinations thereof. Of course, other solvents may also be utilized. Non-limiting examples of suitable surfactants include Surfynol® Surfactants commercially available from Air Products and Chemicals, Inc. of Allentown, Pa. Suitable non-limiting examples of plasticizers include Coroc® Acrylic Plasticizer Resins commercially available from Cook Composites and Polymers of St. Louis, Mo.

The one or more additives may also include a catalyst to enhance curing. Such catalysts, which are well-known in the art, may include, but are not limited to, p-toluenesulfonic acid, dinonylnaphthalene disulfonic acid, dodecylbenzenesulfonic acid, phenyl acid phosphate, monobutyl maleate, butyl phosphate, hydroxy phosphate ester, and combinations thereof. Typically, acids that interfere with the organoborane-amine complex are excluded from use. However, it is contemplated that such acids may be used. Other catalysts that may be useful in the composition include, but are not limited to, Lewis acids, transition metal salts such as zinc salts and tin salts, and combinations thereof. The catalyst may be blocked, unblocked, or partially blocked. The catalyst may be blocked or partially blocked with an amine or other suitable blocking agent such as an oxirane modifying material. If included, the catalyst is preferably included in an amount of 0.1 to 1.2, more preferably of 0.1 to 0.9, and most preferably of 0.2 to 0.7, parts by weight per 100 parts by weight of the composition.

If the composition includes a solvent as the one or more additives, the solvent may be any known in the art, including water, and may be HAPs free. In one embodiment, the solvent includes a polar organic solvent. In another embodiment, the solvent includes a polar aliphatic solvent. In an additional embodiment, the solvent includes a polar aromatic solvent. In yet another embodiment, the solvent is selected from the group of a ketone, an ester, an acetate, an aprotic amide, an aprotic sulfoxide, an aprotic amine, and combinations thereof. Non-limiting examples of useful solvents include methyl ethyl ketone, methyl propyl ketone, methyl isobutyl ketone, m-amyl acetate, ethylene glycol butyl ether-acetate, propylene glycol monomethyl ether acetate, xylene, N-methylpyrrolidone, 2-ethylhexanol, n-butanol, dipropylene glycol methyl ether, SC 150 solvent commercially available from Exxon Mobil of Irving, Tex., naptha, heavy benzene, ethyl ethoxypropionate, butylglycol acetate, butylglycol, blends of aromatic hydrocarbons such as Aromatic 100, butyl alcohol, ethyl acetate, butyl acetate, butyl alcohol, propylene glycol monomethyl ether acetate, dipropylene glycol propyl ether, mineral spirits, 2-butoxy ethanol, dipropylene glycol monomethyl ether, dibutyl ether, 2-ethylhexanol, and combinations thereof. If included, the solvent is typically included in an amount of up to 60, more typically in an amount of from 5 to 50, and most typically in an amount of from 10 to 40, parts by weight per 100 parts by weight of the composition.

Further, the one or more additives may include a pigment. When, for example, the composition is used as a basecoat, the pigment may include organic and/or inorganic compounds, colored materials, fillers, metallic and/or inorganic flake materials such as mica or aluminum flake, and combinations thereof. Non-limiting examples of suitable pigments include a carbon black pigment, titanium dioxide and other inorganic colored pigments, such as iron oxide, chrome yellow, moly orange, titanium yellow, nickel titanate yellow, chrome greens, and the like. If included, the pigment is typically included in an amount of up to 60, more typically in an amount of from 5 to 50, and most typically in an amount of from 10 to 40, parts by weight per 100 parts by weight of the composition.

Still further, the one or more additives may include a leveling agent. The leveling agent may include, but is not limited to, vinyl acrylic copolymers, and the like. If included, the leveling agent is typically included in an amount of up to 20, more typically in an amount of from 1 to 10, and most typically in an amount of from 2 to 5, parts by weight per 100 parts by weight of the composition.

Alternatively, the one or more additives may include a stabilizer. The stabilizer may include hindered amine light stabilizers (HALS). If included, the HALS may include any known in the art. Preferably, if included, the HALS have a molecular weight of less than 300 g/mol and more preferably of less than 260 g/mol. Illustrative examples of commercially available HALS that are suitable for use in the present invention include, but are not limited to, Sanduvor® 3058 commercially available from Sandoz LTD. Corporation of Basel, Switzerland, and Tinuvin® 123, 292, and 384 commercially available from Ciba-Geigy Corporation of Ardsley, N.Y. If included, the stabilizer is typically included in an amount of up to 20, more typically in an amount of from 1 to 10, and most typically in an amount of from 2 to 5, parts by weight per 100 parts by weight of the composition.

Referring back to the method itself, the method includes the step of introducing the organoborane-amine complex, the radical polymerizable compound, and the optional amine, onto a substrate to form the composition. The organoborane-amine complex, the radical polymerizable compound, and the optional amine may be introduced onto the substrate separately, together, or in various combinations. The step of introducing may include any application method known in the art. Suitable application methods include, but are not limited to, spray coating, dip coating, roll coating, curtain coating, electrostatic spraying, and combinations thereof. In one embodiment, the organoborane-amine complex, the radical polymerizable compound, and the optional amine are applied to the substrate via electrostatic spraying for extrusion coating.

In various embodiments, the substrate is further defined as a reactor or a vessel. The reactor and/or vessel may be laboratory or industrial sized. Typically, when the substrate is further defined as the reactor and/or vessel, the radical polymerizable compound is polymerized in the reactor or vessel. Once formed, the polymerized compound can then be further used as selected by one of skill in the art. In one embodiment, the polymerized compound is applied to an automobile component after being formed in the reactor.

Alternatively, the substrate may be further defined as the automobile component itself. The automobile component may be a door, hood, roof, panel, etc., and the like. In this embodiment, the method typically includes forming the coating composition, and polymerizing the radical polymerizable compound, on the automobile component and not in the vessel or reactor. However, as described above, the method is not limited to such an embodiment.

In one embodiment, the substrate is a sheet of organic or inorganic material such as carbon fiber, steel, aluminum, and the like. The substrate may be coated or uncoated, treated or untreated, and combinations of these. In various embodiments, the substrate is selected from the group of plastic, metals such as steel, iron, and aluminum, and combinations thereof. Alternatively, the substrate may include steel and/or extruded automobile parts. In another embodiment, the substrate is further defined as an automobile component. In yet another embodiment, the substrate includes automotive body panels and preferably is primed or electrocoated.

In the method of this invention, the organoborane-amine complex dissociates (i.e., breaks apart) to free the organoborane initiator from the amine, as described in detail above. The organoborane-amine dissociates in the coating composition via in-situ formation of the carbamic zwitterion. The terminology "in-situ" refers to forming the carbamic zwitterion in the coating composition. The carbamic zwitterion is typically formed from a reaction of carbon dioxide and free amine groups (whether unbound as part of the organoborane-amine complex or as part of the optional amine) that are present in the composition. Accordingly, the method of this invention also includes the step of introducing carbon dioxide into the coating composition (on the substrate) in a molar ratio of at least 1:1 of the carbon dioxide to the free amine groups present in the composition. More typically, the carbon dioxide is introduced into the coating composition (on the substrate) in a molar ratio of at least 1:2 with a sum total of both free and bound amines present in the composition. Typically, large stoichiometric excesses (>10:1) of carbon dioxide to free amine groups and/or the sum total of both free and bound amines is utilized. In one embodiment, the step of introducing the organoborane-amine complex, the radical polymerizable compound, and optionally the amine occurs simultaneously with the step of introducing the carbon dioxide. In this embodiment, the carbon dioxide may begin to react with free amine groups to form the carbamic zwitterion before the organoborane-amine complex, the radical polymerizable compound, and the optional amine are on the substrate. In another embodiment, the step of introducing the organoborane-amine complex, the radical polymerizable compound, and optionally the amine occurs before the step of introducing the carbon dioxide. It is to be understood that the carbon dioxide may be introduced to one or more of the organoborane-amine complex, the radical polymerizable compound, and the optional amine apart from the composition such that when these compounds are combined, the carbon dioxide is then introduced into the composition.

The step of introducing the carbon dioxide into the composition may be further defined as allowing the carbon dioxide to permeate into the composition from the atmosphere, as injecting the carbon dioxide into the composition, as spraying the carbon dioxide over the composition, or as combinations thereof. Typically, the composition on the substrate is placed in a carbon dioxide atmosphere such that the carbon dioxide permeates into the composition. In one embodiment, the step of introducing the carbon dioxide is further defined as spraying the carbon dioxide from a nozzle of a spray gun such as an impingement spray gun. The nozzle and the impingement spray gun may be any known in the art. In another embodiment, the step of introducing the carbon dioxide is further defined as exposing the composition to an atmosphere of carbon dioxide in a gas sink as further described in the patent application entitled System And Method For Curing A Composition, filed on the same day herewith, having the U.S. Ser. No. 61/220,929.

Alternatively, the step of introducing the organoborane-amine complex, the radical polymerizable compound, and optionally the amine, may be further defined as spraying the organoborane-amine complex, the radical polymerizable compound, and optionally the amine onto the substrate. In this embodiment, the step of introducing the carbon dioxide is further defined as spraying the carbon dioxide from a nozzle of a spray gun. Also in this embodiment, the step of spraying the carbon dioxide is further defined as shaping the organoborane-amine complex, the radical polymerizable compound, and optionally the amine with the carbon dioxide as the organoborane-amine complex, the radical polymerizable compound, and optionally the amine are being sprayed.

The carbon dioxide used in this invention is typically gaseous but may be a supercritical fluid. In addition, the carbon dioxide may originate from dry ice, from the supercritical fluid, or may be extracted from flue gas produced in coal fired power plants. In one embodiment, a low pressure gas (~1 bar) produced from combustion of coal may serve as a source of the carbon dioxide. In other embodiments, the carbon dioxide is provided from gas tanks that include regulators, as a by-product of an ancillary chemical reaction, as a by-product of a biological process, as a by-product of a manufacturing operation, from a carbon dioxide generator, as a by-product from combustion of natural gas, as a by-product from gasification of coal, as a by-product of various carbon-containing fuel sources, from flue gas streams, such as abatable flue gas streams, or from combinations thereof.

Without intending to be bound by any particular theory, it is believed that a single free amine group reacts with a single molecule of carbon dioxide via the mechanism set forth in FIG. 1 to form the carbamic zwitterion, as described in greater detail below. Accordingly, at least a 1:1 molar ratio of the carbon dioxide to the free amine groups is required. Of course, the carbon dioxide may be present in a molar excess to the free amine groups. In various embodiments, the carbon dioxide is present in a molar ratio of from greater than at least 2:1 to about 10:1 to the free amine groups. In other embodiments, the carbon dioxide is present in a molar ratio of from greater than about 10:1 to about 1000:1 to the free amine groups. In still other embodiments, the carbon dioxide is present in a molar ratio of greater than 1000:1 to the free amine groups. Typically, a stoichiometric excess of carbon dioxide is desirable. Any stoichiometric excess of carbon dioxide can be easily recovered and re-used, thereby reducing emissions and pollution.

The method of this invention also includes the step of reacting the carbon dioxide and the free amine groups to form the carbamic zwitterion in-situ thereby forming a radical. More specifically, once the carbamic zwitterion is formed in-situ, the organoborane-amine complex dissociates thereby forming the radical. Without intending to be bound by any particular theory, it is believed that the carbamic zwitterion acts as a deblocking agent and a proton (H+) source and reacts with the bound amine of the organoborane-amine complex thereby breaking apart (dissociating) the organoborane-amine complex into the organoborane initiator and the reaction product of the amine and the carbamic zwitterion. Although the exact mechanism of the dissociation of the organoborane-amine complex is unknown, one possible mechanism is set forth in FIG. 1. Alternatively, the proton from the carbamic zwitterion may be transferred to a free amine group or to water, thereby forming acidic species which protonate the bound amine of the organoborane-amine complex causing dissociation, as set forth in FIG. 2. It is also contemplated that proton may be transferred from a nitrogen atom of the carbamic zwitterion to an oxygen atom of the carbamic zwitterion thereby forming an unstable "carbamic acid type" compound that protonates the bound amine of the organoborane-amine complex causing dissociation, as set forth in FIG. 3.

Figure 1:
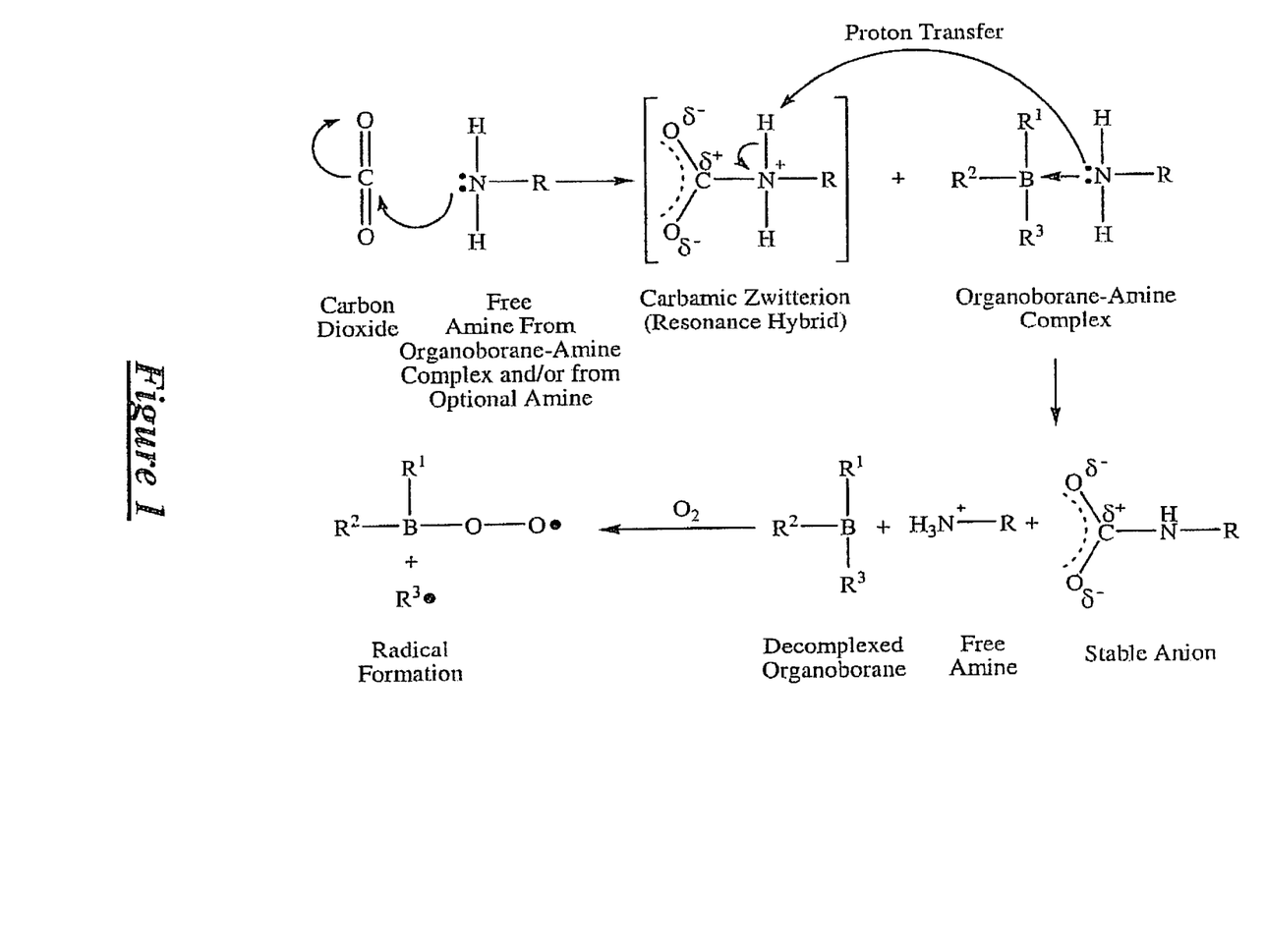
FIG. 1 illustrates a first theoretical reaction mechanism including reaction of carbon dioxide with a free (primary) amine to form a carbamic zwitterion, proton extraction from the carbamic zwitterion through reaction with the blocking amine of the organoborane-amine complex, and dissociation of the organoborane from the amine thereby leading to radical formation in the presence of $O_2$.

Without intending to be bound by any particular theory, it is believed that the carbamic zwitterion is formed via the mechanism set forth in FIG. 1, as first introduced above. In other words, one of the lone pair electrons of the free amine attacks the carbon atom of the carbon dioxide causing an electron pair from one of the C=O bonds to migrate to an oxygen atom, thus forming the carbamic zwitterion that carries a total net charge of 0 but carries positive and negative charges on different atoms. Relative to this method, it is believed that the carbamic zwitterion has the following configurations:

Carbamic Zwitterion (Resonance Contributor)   Carbamic Zwitterion (Resonance Hybrid)   Carbamic Zwitterion (Resonance Contributor)

In addition to the steps described above, the method may also include the step of introducing a second gas to the composition and/or the substrate. The second gas may be sulfur dioxide. The second gas may be introduced by any method described above relative to the step of introducing the carbon dioxide. Without intending to be bound by any particular theory, it is believed that the second gas may react with the free amine groups via similar mechanisms as the carbon dioxide.

The method also includes the step of polymerizing the radical polymerizable compound using the radical. In one embodiment, the step of polymerizing is further defined as polymerizing at a temperature of from −78° C. to 35° C. In another embodiment, the step of polymerizing is further defined as polymerizing at a temperature of from 20° C. to 30° C. In yet another embodiment, the step of polymerizing is further defined as polymerizing at about room temperature. Alternatively, the method may include the step of applying heat and/or radiation to the composition and/or radical polymerizable to polymerize the radical polymerizable compound. The step of polymerizing the radical polymerizable compound may be further defined as polymerizing/cross-linking reactions to form a cured coating composition (e.g. film) on the automobile component.

The step of polymerizing using the radical can be further defined as polymerizing by free radical polymerization. The mechanism of free radical polymerization is well known in the art and typically includes three stages: initiation, propagation, and termination. The initiation and propagation stages are generally outlined in FIG. 4. Typically, and as described above, a homolytic substitution reaction occurs between triplet oxygen and the organoborane initiator thereby forming an alkyl radical (R•) which reacts with oxygen and/or the radical polymerizable compound and forms a radical. The alkyl radical (R•) typically propagates a developing polymer chain through additional homolytic reactions of the radical polymerizable compound and any second, third, or additional radical polymerizable compounds, as set forth in FIG. 4. The termination stage may include coupling wherein two radical species react with each other forming a single molecule. Alternatively, chain disproportionation may occur wherein two radicals meet and exchange protons.

In one embodiment, the method also includes the step of limiting an amount of oxygen introduced to the composition because it is believed that a presence of oxygen in the coating composition may inhibit radical formation by forming less reactive radical species that inhibit polymerization. Similarly, the method may also include the step of limiting an amount of oxygen introduced to the substrate (i.e., to a surface of the substrate) to minimize oxygen surface inhibition. The oxygen may be introduced to the substrate and/or composition in a molar ratio of from 1:1 to 5:1 with the organoborane initiator. In other embodiments, the oxygen is present in the composition and/or at the substrate in an amount of 0.5 to 5 parts by weight per 100 parts by weight of the carbon dioxide.

In yet another embodiment, the method further includes the step of electrocoating the substrate (e.g. the automobile component) with a first composition. The process of electrocoating and the compositions used to electrocoat substrates are well known in the art. Thus, the step of electrocoating in this invention may be completed using any techniques known in the art. Similarly, the first composition that is used to electrocoat the substrate may be any known in the art suitable for electrocoating and may include, but is not limited to, epoxies, amines, isocyanates, and combinations thereof. In a further embodiment, the step of applying the coating composition to the substrate is further defined as applying the coating composition to the first composition on the automobile component. In this embodiment, the first composition is applied to the substrate via the step of electrocoating described above.

In still other embodiments, the method includes one or more of the steps of drawing down the composition on the substrate, of heating the substrate, of applying radiation to the substrate, of drying the substrate, and/or of installing the automobile component including the cured composition on an automobile chassis. Alternatively, the step of polymerizing the radical polymerizable compound using the radical may occur in the absence of external heating of the coating composition.

In an alternative embodiment, the method also includes the step of reclaiming at least part of the carbon dioxide used in the method. At least part of the carbon dioxide may be reclaimed through a thermally reversible reaction of the carbamic zwitterion. Accordingly, the step of reclaiming may be further defined as heating the carbamic zwitterion to reform at least part of the carbon dioxide used in the method.

EXAMPLES

A series of coating compositions (Compositions 1-8) are formed and applied to substrates using the method of the instant invention, as described below. Notably, none of the Compositions 1-8 includes a photoinitiator.

Formation of Composition 1:

Composition 1 is formed by combining 10.0 grams of Laromer UA 9061 as the radical polymerizable compound and 0.48 grams of triethylborane cysteamine (TEB-CA) as the organoborane-amine complex. Laromer UA 9061 is an aliphatic urethane acrylate that is commercially available from BASF Corporation.

Formation of Composition 2:

Composition 2 is formed by combining 10.04 grams of Laromer UA 9061 as the radical polymerizable compound and 0.99 grams of tri-n-butylborane cysteamine (TnBB-CA) as the organoborane-amine complex.

Formation of Composition 3:

Composition 3 is formed by combining 10.03 grams of Laromer UA 9061 as the radical polymerizable compound and 0.53 grams of tri-sec-butylborane diaminopropane (TsBB-DAP) as the organoborane-amine complex.

Formation of Composition 4:

Composition 4 is formed by combining 9.94 grams of Laromer UA 9061 as a radical polymerizable compound and 0.58 grams of triethylborane diaminopropane (TEB-DAP) as the organoborane-amine complex.

Formation of Composition 5:

Composition 5 is formed by combining 9.97 grams of Laromer UA 9061 as a radical polymerizable compound and 0.54 grams of tri-n-butylborane diaminopropane (TnBB-DAP) as the organoborane-amine complex.

Formation of Composition 6:

Composition 6 is formed by combining 10.06 grams of Laromer UA 9061 as a radical polymerizable compound and 0.58 grams of tri-n-butylborane diaminopropane (TnBB-DAP) as the organoborane-amine complex. The TnBB-DAP includes a 6% molar excess of the DAP.

Formation of Composition 7:

Composition 7 is formed by combining 10.06 grams of Laromer UA 9061 as a radical polymerizable compound and 0.57 grams of tri-n-butylborane diaminopropane (TnBB-DAP) as the organoborane-amine complex. The TnBB-DAP includes a 12% molar excess of the DAP.

Formation of Composition 8:

Composition 8 is formed by combining 10.15 grams of Laromer UA 9061 as a radical polymerizable compound and 0.50 grams of tri-n-butylborane diaminopropane (TnBB-DAP) as the organoborane-amine complex. The TnBB-DAP includes 0.75 moles of DAP per every 1 mole of TnBB such that there is a molar excess of TnBB and a molar deficiency of DAP. Application of the Compositions to the Substrates:

After formation, each of the Compositions is individually applied to a substrate (i.e., a metal panel that has that has an electrocoat layer applied) to coat the substrate. After application, each of the Compositions is drawn down with a #4 or #8 bar. Subsequently, the coated substrates are placed in a carbon dioxide atmosphere wherein the carbon dioxide in present in great molar excess to the free amine groups present in the Compositions. Once in the carbon dioxide atmosphere, the Compositions are allowed to cure for 15-60 minutes. After 15-60 minutes, the Compositions are evaluated to determine whether observable cure occurs via visual evaluation. The results of the above evaluations indicate that each of the Compositions 1-8 exhibits observable cure.

Formation and Curing of Comparative Examples:

In addition, samples of the Compositions 1-8 are also applied to substrates in the absence of carbon dioxide as comparative examples of the method of this invention. More specifically, these substrates are placed in atmospheric air that includes carbon dioxide in a molar ratio of less than 1:1 (~350 ppm by volume) with free amine groups present in the Compositions. Once placed in atmospheric air, these Compositions are allowed to cure for several days. After several days, the Compositions are evaluated to determine whether observable cure occurs via visual evaluation. The results of the above evaluations indicate that none of the Compositions 1-8 exhibit observable cure when placed in atmospheric air due to a lack of carbon dioxide that is required by the instant invention.

Accordingly, the data set forth above indicate that the method of the instant invention effectively polymerizes radical polymerizable compounds and allows for observable curing of coating compositions on substrates. In addition, the Compositions 1-8 cure using carbon dioxide that is non-toxic and is not classified as a hazardous air pollutant, thus making this method environmentally friendly and allowing this method to be utilized in large production facilities with minimal emissions and pollution. In addition, the carbon dioxide is inexpensive and is readily available from recycling efforts designed to reduce greenhouse gasses and environmental pollution. Furthermore, use of the carbon dioxide minimizes oxygen surface inhibition of curing thereby increasing the efficiency of this method. Moreover, use of the carbon dioxide improves control of curing rate and allows for use of one-component (1K) systems that reduce cure times.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of forming a coating composition, said method comprising the steps of:
   A. introducing an organoborane-amine complex, a radical polymerizable compound, and optionally an amine onto a substrate to form a coating composition;
   B. introducing carbon dioxide into the coating composition in a molar ratio of at least 1:1 of the carbon dioxide to free amine groups present in the coating composition;
   C. reacting the carbon dioxide and the free amine groups to form a carbamic zwitterion in-situ and to dissociate the organoborane-amine complex thereby forming a radical; and D. polymerizing the radical polymerizable compound using the radical.

2. The method as set forth in claim 1, wherein the substrate is an automobile component and the step of polymerizing is further defined as polymerizing to cure the coating composition on the automobile component, and optionally wherein the method further comprises the step of electrocoating the automobile component with a first composition wherein the coating composition is applied to the first composition on the automobile component.

3. The method as set forth in claim 1, wherein a molar ratio of the free amine groups to the amine of the organoborane-amine complex is about 1:1.

4. The method as set forth in claim 1, wherein the step of reacting is reacting the carbamic zwitterion with a bound amine of the organoborane-amine complex thereby dissociating the organoborane-amine complex into an organoborane initiator and the reaction product of the amine and the carbamic zwitterion.

5. The method as set forth in claim 1, wherein the coating composition further comprises water and the step of reacting is transferring a proton from the carbamic zwitterion to the water to form an acidic species which protonates the bound amine of the organoborane-amine complex causing dissociation of the organoborane-amine complex.

6. The method as set forth in claim 1, wherein the step of reacting is transferring a proton from a nitrogen atom of the carbamic zwitterion to an oxygen atom of the carbamic zwitterion thereby forming an unstable carbamic acid compound which protonates the bound amine of the organoborane-amine complex causing dissociation of the organoborane-amine complex.

7. The method as set forth in claim 1, further comprising the step of limiting an amount of oxygen introduced into the coating composition, in a molar ratio of from 1:1 to 5:1 with the organoborane of the organoborane-amine complex.

8. The method as set forth in claim 1, wherein the step of introducing the organoborane-amine complex, the radical polymerizable, and optionally the amine, is further defined as spraying the organoborane-amine complex, the radical polymerizable compound, and optionally the amine onto the substrate.

9. The method as set forth in claim 1, wherein the step of introducing the carbon dioxide is as spraying the carbon dioxide from a nozzle of a spray gun, and optionally wherein the step of spraying the carbon dioxide is combining the organoborane-amine complex, the radical polymerizable compound, and optionally the amine with the carbon dioxide as the organoborane-amine complex, the radical polymerizable compound, and optionally the amine are being sprayed.

10. The A method as set forth in claim 1, further comprising the step of introducing a second gas to the coating composition wherein the second gas is sulfur dioxide.

11. The method as set forth in claim 1, wherein the organoborane-amine complex has the following formula:

wherein each of $R^1$, $R^2$, $R^3$, $R^4$, $R^5$, and $R^6$ is independently selected from the group of a hydrogen atom, an alkyl group, an alkoxy group, an arylalkyl group, an alkylene group, halogenated homologs thereof, and combinations thereof and at least one of $R^4$, $R^5$, and $R^6$ is optionally a functional group containing nitrogen or sulfur.

12. The method as set forth in claim 1, wherein the radical polymerizable compound is selected from the group consisting of a) unsaturated acrylic and methacrylic ester, resin, b) functional acrylic and methacrylic ester monomer and combinations thereof.

13. The method as set forth in claim 1 wherein the radical polymerizable compound is present in an amount of from 50 to 80 parts by weight per 100 parts by weight of the coating composition and the organoborane-amine complex is present in an amount of from 2 to 5 parts by weight per 100 parts by weight of the coating composition.

14. The method as set forth in claim 1, wherein the step of introducing the organoborane-amine complex, the radical polymerizable compound, and optionally the amine occurs before the step of introducing the carbon dioxide.

15. The method as set forth in claim 1, wherein the step of introducing the carbon dioxide is exposing the coating composition to an atmosphere of carbon dioxide in a gas sink.

16. The method as set forth in claim 1, wherein in step D is carried out in the absence of external heating.

17. The method as set forth in claim 1, wherein in step D is carried out at a temperature of from 20° C. to 30° C.

18. The method as set forth in claim 1, wherein a molar ratio of the free amine groups to the amine of the organoborane-amine complex is from about 0.5:1 to 1:1.

19. The method as set forth in claim 1, wherein a molar ratio of the free amine groups to the amine of the organoborane-amine complex is less than about 1:1.

20. The method as set forth in claim 1, further comprising the step of limiting an amount of oxygen introduced into the coating composition, in an amount of 0.5 to 5 parts by weight of the oxygen per 100 parts by weight of the carbon dioxide present in the coating composition.

21. A method of forming a coating composition, said method comprising the steps of:

A. introducing an organoborane-amine complex, a radical polymerizable compound, carbon dioxide and optionally an amine onto a substrate to form a coating composition and wherein a molar ratio of at least 1:1 of the carbon dioxide to free amine groups present in the coating composition;

B. reacting the carbon dioxide and the free amine groups to form a carbamic zwitterion in-situ and to dissociate the organoborane-amine complex thereby forming a radical; and C. polymerizing the radical polymerizable compound using the radical.

* * * * *

UNITED STATES PATENT AND TRADEMARK OFFICE
CERTIFICATE OF CORRECTION

PATENT NO. : 8,647,716 B2  Page 1 of 1
APPLICATION NO. : 13/379377
DATED : February 11, 2014
INVENTOR(S) : Gutowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 110 days.

Signed and Sealed this
Twenty-ninth Day of September, 2015

Michelle K. Lee
*Director of the United States Patent and Trademark Office*